Sept. 4, 1956
G. J. DE JONG ET AL
2,761,885
PREPARATION OF XYLENES FROM CONDENSATION
PRODUCTS OF TOLUENE AND FORMALDEHYDE
Filed Feb. 18, 1955
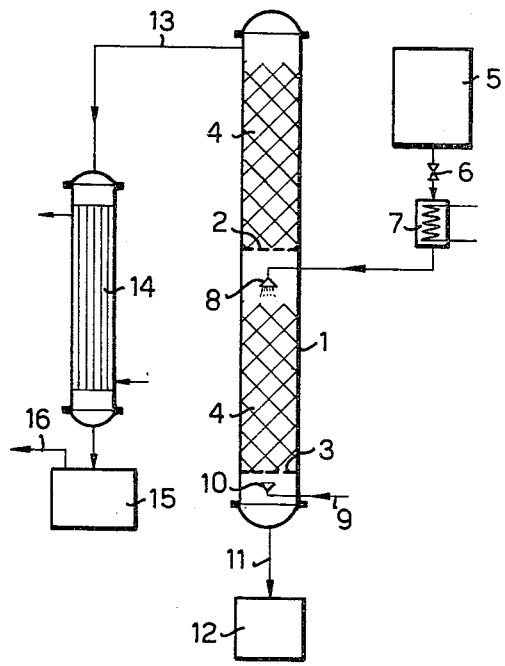
INVENTORS:
Geert J. de Jong,
Jan Koorevaar,
BY Cushman, Darby & Cushman
ATTORNEYS.

United States Patent Office 2,761,885
Patented Sept. 4, 1956

2,761,885

PREPARATION OF XYLENES FROM CONDENSATION PRODUCTS OF TOLUENE AND FORMALDEHYDE

Geert J. De Jong, Huizen, and Jan Koorevaar, Geleen, Netherlands, assignors to Stamicarbon N. V., Heerlen, Netherlands Application February 18, 1955, Serial No. 489,190

Claims priority, application Netherlands February 23, 1954

11 Claims. (Cl. 260—668)

The present invention relates to the preparation of xylenes from condensation products of toluene and formaldehyde.

It is known that by reacting toluene with formaldehyde condensation products can be obtained which mainly consist of ditolyl methane and tolyl methane hydrocarbons of higher molecular weight.

These condensation products of higher molecular weight contain more than two tolyl groups and more than one substituted methyl group per molecule, so that they are built up of units whose structure may be represented as follows

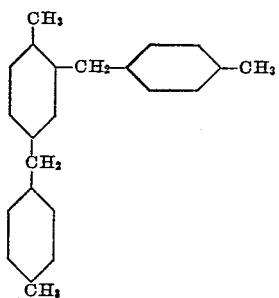

and

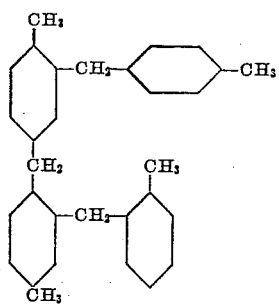

It has now been found that high yields of xylenes can be obtained from condensation products of toluene and formaldehyde, if these condensation products are led over a catalyst containing aluminum silicate at a temperature of over 300° C. In this way, the condensation products of toluene and formaldehyde are decomposed to products of lower molecular weight, mainly consisting of toluene and xylenes. Surprisingly, no methyl fluorenes are found in the reaction product. Moreover, hardly any isomerization due to displacement of ring substituents is encountered. Thus, for instance, the decomposition product obtained from diparatolyl methane is mainly toluene and paraxylene. Similarly, ortho-para-ditolyl methane forms, besides toluene, both ortho-xylene and para-xylene, but practically no meta-xylene. Xylenes are also formed in the decomposition of the condensation products of higher molecular weight, i. e., the so-called polytolyl methane hydrocarbons. Typically suitable condensation products are those possessing molecular weights of up to 500 and even higher.

While the formation of toluene and xylene from, e. g., diparatolyl methane requires the presence of two atoms of hydrogen per molecule, it has prepared, surprisingly, that it is not necessary to add hydrogen to the decomposition reaction, although it may be included if desired. Likewise, the addition of hydrogen-releasing substances, e. g., hydrogen sulphide, ammonia, saturated hydrocarbons, such as tetralin or pentane, or of mineral oil fractions, such as petroleum ether or benzene, does not appreciably influence the amount of xylenes obtained.

The reaction may be carried out in the presence of an inert gas, such as carbon dioxide or nitrogen. Preferably, steam is used since it has a favorable influence on the reaction process. The amount of inert gas utilized can be widely varied, the preferred amount in any case depending on the nature of the gas itself, the starting material and other operating conditions. Usually, however, the amount of gas will be from one to three times the weight of the starting material.

The process according to the invention may be carried out at atmospheric pressure. Hence, it is not necessary to apply higher pressures or use pressure-resisting apparatus. Superatmospheric pressures may, however, be used if desired, as well as subatmospheric pressures.

If the starting material consists only of condensation products of lower molecular weight, e. g., ditolyl methane, the decomposition is carried out in the vapor phase. With mixtures of condensation products of lower and higher molecular weights part of the reaction may take place in the liquid phase. In either event, the catalysts utilized should contain aluminum silicate as their active component. Examples of suitable catalysts are kaolin, diatomaceous earth, hydrated aluminum silicate and mixtures of aluminum silicate with metal oxides, such as titanium dioxide or thorium or zirconium oxide.

The rate of contact between the silicate and condensation product can be widely varied. For example, a rate of 250 to 1000 grams of condensation product, such as ditolyl methane, per liter of aluminum silicate catalyst per hour gives satisfactory results. However, for best results, it is preferred to use a contact rate of 450 to 550 grams starting material per liter of catalyst per hour.

As indicated, the decomposition temperature should exceed 300° C. Preferably, the temperature is within the range of 375 to 425° C., but temperatures outside this range may be used.

The process according to the invention may be carried out batchwise or continuously by returning non-converted starting material to the decomposition zone. It is also possible to work with a continuous stream of catalyst. For instance, the catalyst may be kept in the fluidized state during the reaction and continuously discharged catalyst may be regenerated, likewise in the fluidized state, by a treatment with air, after which it may be returned to the reaction chamber. The toluene separated from the reaction products can be used again for preparing the starting condensation products of toluene with formaldehyde.

The invention is further illustrated by the following examples.

*Example 1*

A vertically positioned tube filled with aluminum silicate grains of 3–7 mm. in diameter was heated by means of a heating coil to 400–410° C. The weight ratio of $Al_2O_3:SiO_2$ in the catalyst was 1:4.25. Through this tube a ditolyl methane product in the vapor phase was conducted, about 70% of this starting material consisting of diparatolyl methane with the rest being mainly ortho-para-ditolyl methane showing little meta-substitution.

The rate of feed was 500 g. of ditolyl methane per liter of catalyst per hour.

At the same time a mixture of steam and hydrogen (volume ratio 5:1) was led through the tube at the rate of 500 liters (calculated at 20° C. and 1 atm.) per liter of catalyst per hour.

The gases leaving the reaction zone were introduced into a condensation chamber and the condensed components were separated off. The resulting liquid product was distilled. The non-converted ditolyl methane was used again as starting material.

In this way 40% of the ditolyl methane was converted, viz. 20% to toluene, 10% to paraxylene, 4% of orthoxylene and 2% to metaxylene, 4% being pyrolysed on the catalyst. The yield in toluenes and xylenes amounted to 90% of the converted product.

Example 2

In a manner similar to that described in Example 1, another sample of the same starting material was led over a catalyst of the same composition at a temperature of 350° C., while no hydrogen but only steam was added at the same rate as stated in Example 1.

In this way 33% of the ditolyl methane was converted, the yield in toluene and xylene amounting to 80%. The weight ratio toluene:xylene=61:39. The xylene consisted of para-, meta- and ortho-xylene, in the weight ratio 24:7:8.

Example 3

The starting material used was a condensation product of toluene and formaldehyde containing 70% by weight of ditolyl methane and 30% by weight of condensation products of higher molecular weight.

The catalyst applied was granular aluminum silicate (diameter about 5 mm.) with a weight ratio $Al_2O_3:SiO_2 = 1:4$.

The reaction was carried out in the apparatus shown diagrammatically in the annexed drawing, wherein the reaction tube 1 comprises two perforated plates 2 and 3, on which the catalyst 4 was supported. From the storage chamber 5 the starting material was led, via a regulating valve 6, a preheater 7 and a distributor 8, into the reaction tube 1 below the perforated plate 2. Per hour, an amount of 50 cc. of starting material was supplied per 100 cc. of catalyst. The temperature of the preheated starting product was about 250° C. The temperature of the catalyst on the lower plate 3 was kept at 400° C., and the temperature of the catalyst in the top half of the tube, supported on plate 2, was 350° C.

Into the bottom of the reaction tube steam was introduced through conduit 9 and distributor 10. The amount of steam introduced per hour was twice as great as the amount by weight of starting material supplied.

The liquid reaction products of high boiling point were passed from the reaction tube through conduit 11 to the tank 12. The vapors were removed through the conduit 13 to a cooler 14. The condensed reaction products were collected in tank 15 and the gaseous products were removed through conduit 16. Further separation of the reaction products collected in tank 15 was carried out in conventional manner, the means therefor not being shown in the drawing.

In this way a degree of conversion of 29% was reached, while the combined yields in toluene and xylene amounted to 90% by weight (calculated on amount of converted product). The weight ratio toluene:xylene=3:2 and the weight ratio para-:meta-:ortho-xylene=2:0.6:1.

Example 4

In a similar manner, purified diparatolyl methane was led over a catalyst of the same composition using the apparatus described in Example 3.

The temperatures were maintained at the values mentioned in Example 3. The rate of feed was lower, viz. 25 cc. of ditolyl methane per 100 cc. of catalyst per hour, while the amount of steam supplied was twice as great as the amount by weight of starting material supplied.

The degree of conversion was 38% and the yield in toluene and xylene amounted to 94% by weight calculated on amount of converted product. The weight ratio toluene:xylene was 4:1. The xylene consisted mainly of paraxylene.

It will be appreciated that various modifications may be made in the invention as described above. Hence, the invention is not to be considered limited thereby, the scope of the invention being defined in the following claims wherein we claim:

1. A process of preparing a product consisting essentially of toluene and at least one xylene from a condensation product of toluene and formaldehyde consisting essentially of at least one member of the group consisting of ditolyl methane and toluene methane hydrocarbons of higher molecular weight, which comprises contacting said condensation product with aluminum silicate at a temperature above 300° C.

2. The process of claim 1 wherein said contact is effected in the presence of an inert gas.

3. The process of claim 1 wherein said contact is effected in the presence of steam.

4. The process of claim 1 wherein said condensation product is diparatolyl methane.

5. The process of claim 1 wherein contact is effected at the rate of from 450 to 550 grams of condensation product per liter of aluminum silicate per hour.

6. The process of claim 1 wherein the contact temperature is between 375 and 425° C.

7. The process of claim 1 wherein the condensation product is in the vapor state.

8. A process for preparing a mixture of toluene and xylenes which comprises decomposing ditolyl methane by passing a gaseous mixture thereof with steam over an aluminum silicate catalyst at a temperature between 400 and 410° C.

9. The process of claim 8 wherein said gaseous mixture includes free hydrogen gas.

10. The process of claim 8 wherein the gaseous mixture is passed over the aluminum silicate at the rate of 500 grams ditolyl methane per liter of catalyst per hour.

11. A process for preparing a product consisting essentially of toluene and xylenes which comprises passing a gaseous mixture of ditolyl methane and steam in which the amount of steam is from one to three times the weight of ditolyl methane, over an aluminum silicate catalyst at a temperature between 375 and 425° C., and at a rate of 450 to 550 grams ditolyl methane per liter of catalyst per hour.

References Cited in the file of this patent

UNITED STATES PATENTS

| 2,420,688 | Sturrock et al. | May 20, 1947 |
| 2,420,689 | Sturrock et al. | May 20, 1947 |

FOREIGN PATENTS

| 446,450 | Great Britain | Apr. 30, 1946 |